Figure 1:
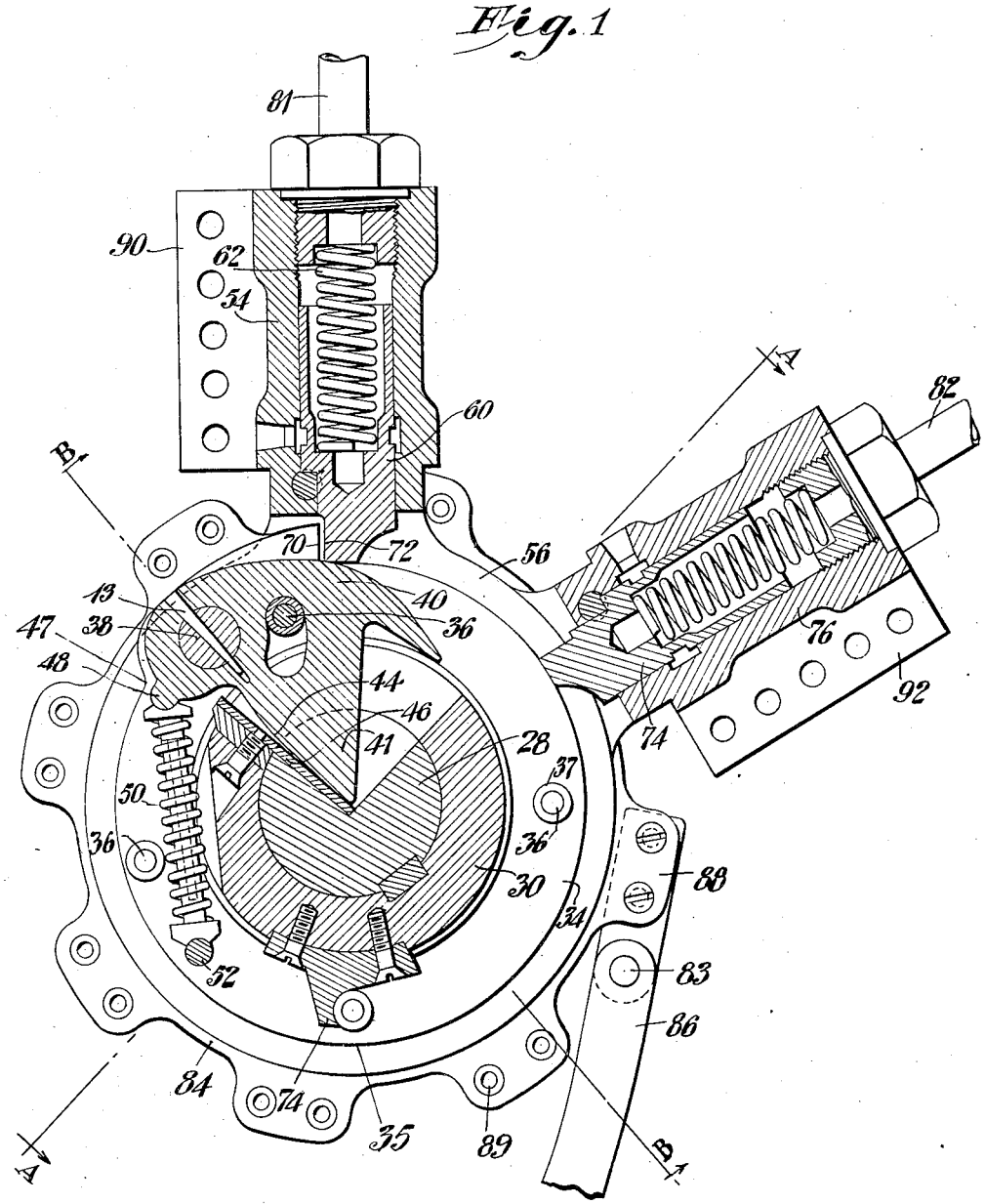

July 1, 1930.  W. E. GOLDSBOROUGH  1,769,686
CAM MECHANISM
Filed April 15, 1926   3 Sheets-Sheet 1

Winder E Goldsborough Inventor
By His Attorney
Edmund G Borden

July 1, 1930. W. E. GOLDSBOROUGH 1,769,686
CAM MECHANISM
Filed April 15, 1926 3 Sheets-Sheet 2
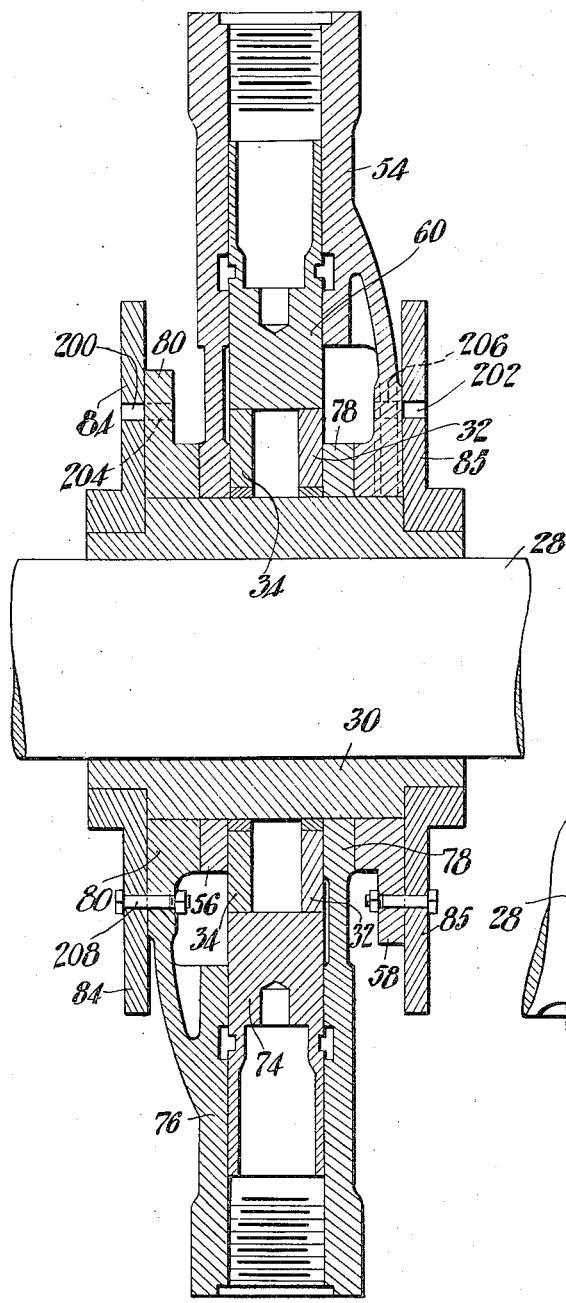
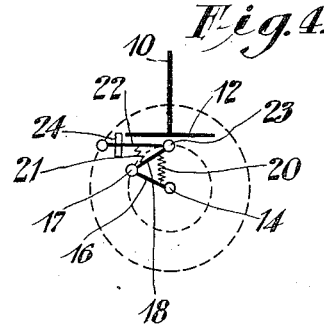
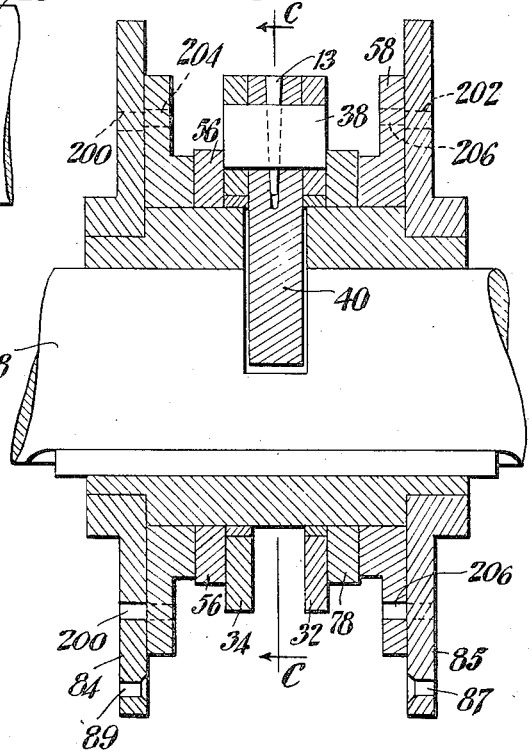
Winder E Goldsborough Inventor
By His Attorney
Edmund G Borden

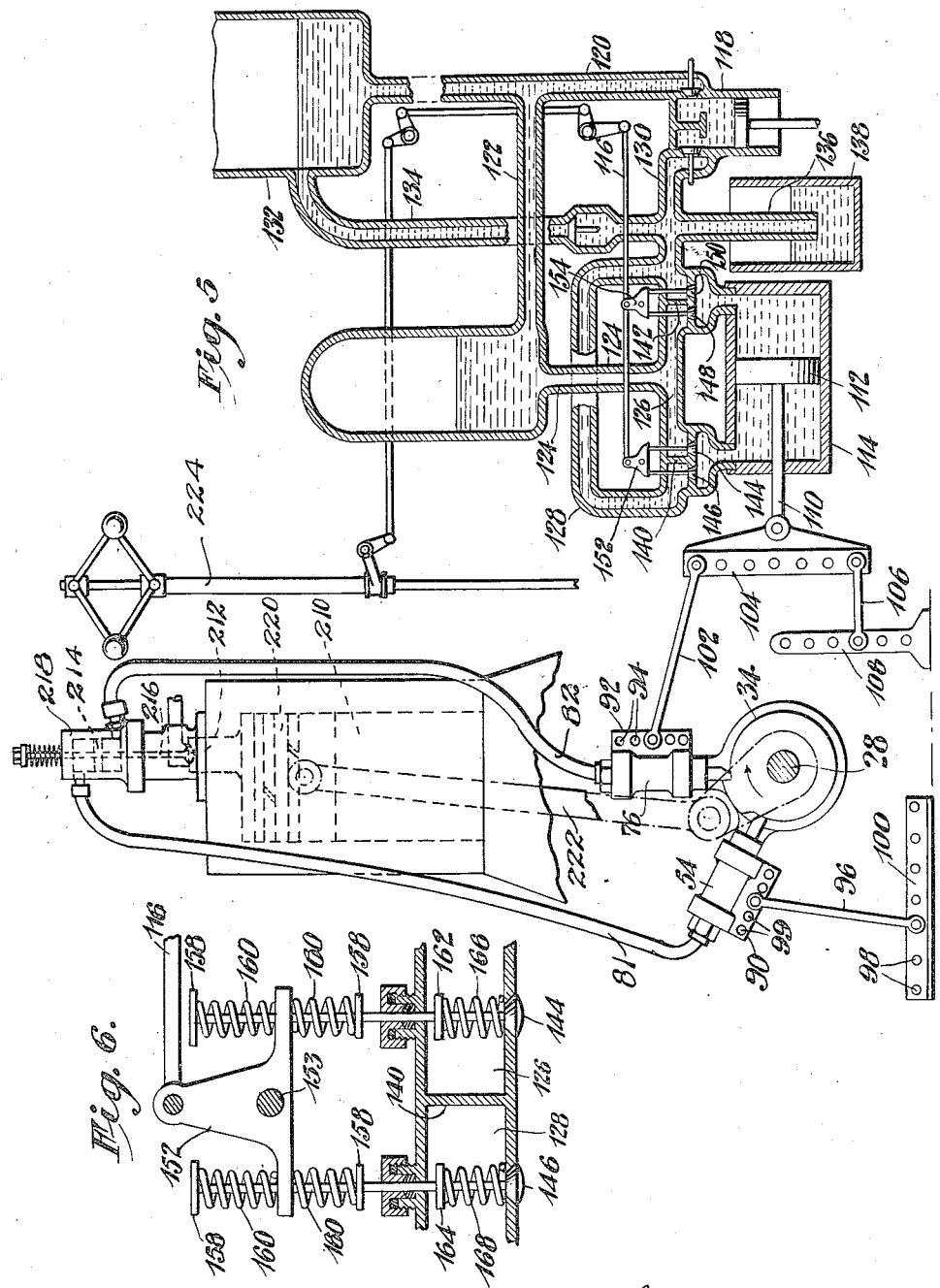

Patented July 1, 1930

1,769,686

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

CAM MECHANISM

Application filed April 15, 1926. Serial No. 102,281.

The present invention relates to a quick-acting cam mechanism and to a method of operating said mechanism. In the design of valve mechanisms in the past it has long been desired to obtain a very quick positive valve movement while avoiding excessive stresses on the valve-rod and excessive wear on the rubbing faces of the cam shafts and the like.

Using ordinary disc cams it has been found advisable to limit the quickness of the valve movement with such cams to such an extent that the time of valve opening occupies at least 20 degrees and frequently 40 to 60 degrees of cam shaft rotation. By means of the present invention it has been found practically possible to open or close the valves of a rapidly rotating engine or compressor within five to fifteen degrees of cam shaft rotation. The value and practical utility of such a quick-acting mechanism and valve control is evident to those versed in the art as well as its application to a wide variety of intermediate quick-acting mechanisms.

The principal object of the present invention is to provide a quick-acting cam mechanism which shall avoid in a large measure difficulties experienced with common types of cam mechanisms and more particularly to provide a cam mechanism capable of very rapid action within the limits of shock and wear imposed by the materials available for use in such mechanism. A further object of the invention is to provide a novel method of operating high speed cam mechanisms, and particularly to provide a method of applying high speed mechanisms to the operation of engine valves of the type used in ordinary combustion engines.

The novel features of the present invention are set forth with particularity in the appended claims. The invention itself, however, together with further objects and advantages, will best be understood from the following description read in connection with the appended drawings. In these drawings the central portion of Figure 1 is a cross-section of an apparatus according to the present invention taken on the line CC of Figure 3. Figure 2 is a diagrammatic longitudinal section on the line AA of the apparatus illustrated in Figure 1; the parts, however, being illustrated in somewhat different positions in Figure 2 from those in Figure 1, in order that the center lines of both the non-rotating cups or cylinders 76 and 54 may lie in the plane of section. Figure 3 is a section on the line BB of Figure 1; Figure 4 is a diagrammatic view illustrating the kinematic principal involved in the apparatus, according to the present invention. Figure 5 is a sectional view, partly diagrammatic, illustrating the application of the apparatus appearing in Figures 1, 2 and 3 to an engine governor-control method and means for carrying out the same. Figure 6 is a detailed view of a part of the said governor-control method and means that operates certain of the valves appearing in the apparatus of Figure 5.

Referring more particularly to Figures 1, 2 and 3; 28 is a constantly rotating driving-shaft or operating member, which is driven with constant angular velocity in a clockwise direction and to which is keyed a sleeve 30. Upon sleeve 30 are mounted two collars, 32 and 34, at right angles to the axis of the shaft 28 and spaced as shown in Figure 3. The collars 32 and 34 are held together by means of pins 36, on which are spacing sleeves 37, and the collars are free to rotate about the sleeve 30 except for the fact that the pivot 38 which extends through the collars 32 and 34, the member 40, the push spring 50 and the pin 52 acting in combination against the plate 46, constrain them. The pivot 38 has a member 40 rigidly attached to it by the pin 13, which member lies between the two collars 34 and 32. This member not only lies between the collars 32 and 34 but rests in a notch or space cut into the sleeve 30 and the shaft 28 as illustrated in Figure 1 and Figure 3.

If now the collars 32 and 34 are retarded relatively to the shaft 28 by the impact of face 70 of the collars on face 72 of the plunger 60 of the non-rotating cylinder 54, the pivot 38 attached to the collars is also retarded relatively to the shaft 28, so that assuming a clockwise rotation for the shaft 28 as viewed in Figure 1, about its center as an axis of rotation, the member 40 will be given a counterclockwise movement about an axis of rotation at pivot 38. The rotation is due to a force exerted by plate 46 on the face 44, which force results in motion about the axis of pivot 38 and is utilized to operate a non-rotating member or plunger 60. Preferably the plunger 60 is normally thrust toward the axis of the shaft 28 by an internal spring 62, so that the member 60 rests on the edges of the collars 32 and 34.

During most of the revolution and except when the aforesaid action takes place, a projection 41 of the member 40 is held in the notch in the shaft 28 by the push of the spring 50 on the lug 48 forming part of the member 40. When the member 60 is lifted by the rotation of member 40 about its axis at 38 it continues to rise until its edge 72 clears the projection 70 on collars 32 and 34, whose outer rims except for the distance from 70 to 47 recede to approximately the same radial distance 35 from the axis of the shaft 28 for the rest of their circumference. After the lift of member 60, projection 41 of the member 40 springs back into its notch under the action of the spring 50, and the collars 32 and 34 after a short quick clockwise movement relatively to 28 again rotate with the shaft 28 and pass under plunger 60 which is in contact with their rim surfaces at all times.

The arrangement of cylinder 54 and plunger 60, together with the other parts of the cam mechanism and other parts described suffices for the repeated operation of various members, assuming that the parts are each time returned to their original positions by spring, gravity, or like action. It is often desired, however, as in the operation of valves for internal-combustion or other engines to predetermine the relative time of movement of a given member or valve in the opposite directions of opening and closing or to determine the relative time phase of the operation of various members or valves. The apparatus according to the present invention can be readily adapted to situations such as these and in part by arranging a second plunger 74 for operation by the member 40.

As illustrated in Figures 1 and 2 cylinder 54 is mounted on rings or radial arms 56 and 58 which in turn encircle and bear upon the sleeve 30 so as to admit of 54 being given various fixed or slowly moved positions in rotation about the axis of rotation of 28. A second plunger 74 is provided mounted in a cylinder 76, the cylinder 76 being in turn mounted for movement about 30 and relative to 54 on the radial arms 78 and 80 fixed to or formed integral with cylinder 76 and surrounding the sleeve 30. As illustrated in Figures 2 and 3, rings 78 and 80 of the cylinder 76 may be arranged alternately on 30 with the rings 56 and 58 of the cylinder 54. The plunger and cylinder construction of members 74 and 76 is substantially the same as that of the members 54 and 60 and the operation of plunger 74 by member 40 will be identical with the operation of member 60 by member 40. Hence, the impulses delivered by member 40 to the two members 74 and 60 can be utilized for two purposes differing in time, such as the opening and closing of a valve and the time interval between the two actions can be varied by changing the angular distance between 60 and 74.

More precisely, the impulse can be transmitted to the valve by means of solid or hydraulic connections or by both in combination, and the angular position of cylinders 54 and 76 in Figure 5 may be adjusted by means of rods or links 96 and 102 connected to the lugs 90 and 92 forming parts of the cylinders 54 and 76, assuming that the solid or hydraulic connections 81 and 82 are sufficiently linked or are flexible or include sufficiently linked or flexible portions.

In the apparatus illustrated in Figure 5, the capacity for adjustment of the apparatus of the type illustrated in Figures 1 and 2 in operating the valves of engines or other types of machinery is controlled by a system of parts arranged to be actuated by any approved form of governor or governing mechanism. For example, the shaft 28 may be the driving shaft of a common type of internal combustion engine having a cylinder 210 containing a combustion chamber and having an inlet valve 212 which it is desired to operate by the quick acting mechanism of the type illustrated in Figs. 1, 2 and 3. The inlet valve 212 is illustrated as mounted on cylinder 210 and as having a piston 214 fixed to its stem 216 and mounted in a barrel 218 in such manner that fluid pressures introduced into barrel 218 on opposite sides of piston 214 act to open and close valve 212. Pressure for operating piston 214 and valve 212 may be introduced into barrel 218 by the ducts 81 and 82. The engine cylinder 210 contains the power piston 220, piston 220 being connected to the shaft 28 by the usual crank and pitman connection 222. The engine whose power cylinder appears at 210, also has a governor 224. Governor 224 is driven from shaft 28 by means not shown and controls a servo-motor by means described below so as to vary the time phase of opening and closing valve 216. As illustrated in Figures 1 and 5, the cylinders 54 and 76 have affixed thereto wing pieces 90 and 92 having rows of apertures 99 and 94 respectively therein. As illustrated in Figure 5, the relative positions of the cylinders 54 and 76 can be readily fixed by means of links connected into the apertures 99 and 94. Also, as illustrated in Figure 5, the position of cylinder 54 is fixed by means of a link 96 connecting one of the apertures 99 of cylinder 54 with a similar aperture 98 in a fixed plate 100. The position of cylinder 54 may nevertheless be adjusted, and during operation if desired, by shifting the link 96 to one of the other apertures 98. As illustrated in Figure 5, the position of cylinder 76 is assumed to be varied automatically from time to time during the operation of the apparatus by governor controlled means acting to move the link 102 connected at one end to one of the apertures 94 of the cylinder 76. The other end of the link 102 is connected to an aperture in a floating lever 104. Opposite the point of connection of link 102, lever 104, is connected by link 106 to a standard 108. Intermediate its points of connection with the links 102 and 106, lever is 104 is pivotally connected to piston-rod 110, the position of which is controlled by liquid acting on the piston 112 in the cylinder 114. The admission and exhaust of liquid to the spaces in cylinder 114 at opposite sides of the piston 112 is controlled by a governor acting on a rod 116. Liquid under pressure for operating piston 112 may be conveniently supplied from a pump 118. Liquid from pump 118 is led to the opposite ends of the cylinder 114 through pipes 120, 122, 124 and passage 126. Liquid exhausted from cylinder 114 is carried away through pipes 128 and 130 to the inlet side of the pump 118. A storage tank 132 may be conveniently connected to the high-pressure pipe 120 and an overflow pipe 134 is preferably provided leading from the tank 132 to the low pressure pipe 130. In this way a substantially constant hydraulic head is maintained in the tank 132 and therefore a constant pressure is available for operating piston 112. The suction side of the pump, moreover, may be connected with a pipe 136 leading into the pipe 130 and arranged to take liquid from a sump 138 through which make-up liquid for the system may be provided. High pressure passage 126 is separated at its ends from the low pressure pipes 128 and 130 by means of webs 140 and 142 respectively. Inlet and outlet ports for cylinder 114 are provided on opposite sides of both the webs 140 and 142. Inlet port adjacent web 140 is controlled by a valve 144 and the outlet port on the other side of web 140 is controlled by a valve 146. Similarly, the inlet and outlet ports at the other end of cylinder 114 and adjacent web 142 are controlled respectively by the valves 148 and 150. Each inlet valve is connected to an outlet valve by means of a rocker, valves 144 and 146 being connected to rocker 152 and valves 148 and 150 being connected to rocker 154. Rockers 152 and 154 project upwardly from the upper ends of the valve stems to which they are connected and the rod 116 previously mentioned is pivoted to the rockers at their upper ends. It will be seen that the piston 112 is illustrated in Figure 5 in its central position, all the valves 144, 146, 148 and 150 being closed.

If now the governor draws the rod 116 toward the right as viewed in Fig. 5, high-pressure valve 144 at the left end of cylinder 114 will be opened, also low-pressure valve 150 at the left end of the cylinder will be opened, liquid flowing into the left end of the cylinder and out of its right end and thereby moving piston 112 from left to right and swinging the cylinder 76 of the valve operating mechanism for the engine clockwise as viewed in Fig. 5. The clockwise movement of cylinder 76 increases the time between the opening and closing of the valve of the engine controlled by cylinders 54 and 76. Similarly, if the governor of the engine should move the rod 116 toward the left as viewed in Fig. 5, the opposite effect will be produced.

Figure 6 illustrates a convenient means of transmitting the motion from the rod 116 to the valves for controlling the flow of liquid to the cylinder 114. As illustrated in Figure 6, the stems of the valves 144 and 146 are extended up through the rocker 152 and each of the valve stems carries a pair of stops 158, 158, one on each side of the point where the valve stems pass through the rocker 152. Between the stops 158 and the rocker 152 each valve stem carries a pair of springs 160, 160. Within the passages 126 and 128 the stems of valves 144, 146 carry additional stops 162 and 164 respectively and springs 166 and 168 are provided on the stems of the valves under compression respectively between the stop 162 and the inner face of passage 126 and between the stop 164 and the inner face of passage 128, springs 166 and 168 tending normally to hold the valves 144 and 146 in closed position. It will be obvious from the foregoing that a rocking movement of member 152 on its pivot 153 caused by the reciprocation of rod 116 will be transmitted through the springs 160 to the valves 144, 146 to cause one or the other to open depending upon the direction of motion of the rod 116.

In connection with Figure 5 it is to be noted that the link 106 can be dispensed with by attaching the lever 104 rigidly to the piston rod 110. By so doing the tension on the piston rod 110 in moving the cylinder 76 is decreased over what it would be under the arrangement shown in Figure 5, but, on the other hand, the range of movement of the cylinder 76 for a given movement of the piston 112 is also decreased.

In Figure 5 cylinder 54 is shown held rigidly by connection to 100 while cylinder 76 is shown connected movably through links to piston 112. Contrariwise cylinder 54 can be connected movably to piston 112 and cylinder 76 can be rigidly connected to 100 or both cylinders can be connected movably to piston 112 or connected rigidly to 100. In the event that either or both of the cylinders 54 and 76 when placed in desired positions are not so located as to be conveniently connected from 90 or 92 to 104 or 100 as occasion may require, recourse may be had to a further adjustment made possible by the plates 84 and 85 illustrated in Figs. 1, 2 and 3. Plates 84 and 85 each carries a series of equally spaced holes 200 and 202 respectively located at a common distance from the surface of the sleeve 30; the holes in 84 being drilled in the same cylindrical plane as a series of similar uniformly spaced holes 204 in the web of 80, the number of holes in 80 not shown being some convenient odd number as related to the holes in 84. By bolting 80 to 84 the cylinder 76 by bolt 208 can be put in any desired radial position within the 360° with reference to 28 in Figure 5 and can then be conveniently connected to either the upper or lower half of 104 by a rod such as 86 shown in Figure 1 attached to some one of the projections on 84 such as 88. The rod 86 of Figure 1 is jointed by the pin 83 and fastened to the projection 88 of 84 by two counter-sunk bolts passing thru holes 89 in projection 88 thereby connecting 86 firmly to 88 while admitting of its having a flexible connection to either 104 or 100 as occasion may demand. By similar means like variable adjustments anywhere within the 360° of cylinder 54 in relation to 28 can be made to 100 or to either the upper or lower half of 104. It is further to be noted that by a proper connection between 76 and 104 the cylinder 76 can be given either a clockwise or a counter-clockwise movement when piston 112 moves to the right or either a counter-clockwice or clockwise movement when piston 112 moves to the left. The same facility of adjustment can also be accomplished with relation to cylinder 54 by using similar means in connection wtih holes 202 and 206, holes 202 and 206 being in plate 85 and ring 58 respectively. The plate 85 has holes 87 therein similar to holes 89 in plate 84 thereby permitting a rod similar to 86 to be connected to plate 85 in the manner just described. Furthermore, by correctly selecting the points of adjustment as between the cylinders 54 and 76 and the lever 104 the cylinder 54 may be given a greater or less angular movement than the cylinder 76 either in the same or in the opposite direction for any given movement of piston 112. A consideration of these facts will show that the means provided admit of a most varied and flexible system of valve timing and engine regulation and that as between a number of valves of the same engine all operated by the same control mechanism and connected variously to the lever 104 extended at right angles to the plane of the drawing equally to both sides of 110 almost any desired control of these valves in relation to one another can be obtained.

In further elucidation of the novel and fundamental aspects of the present invention particularly in relation to that portion of the invention which is disclosed in Figures 1, 2 and 3 the kinematic design is disclosed in Figure 4, consideration of which brings realization of the varied applications which can be made of the variable forms which can be given to the principles embodied in this invention.

Referring to Figure 4: The link 16 rotates in a clockwise direction with constant angular velocity around the fixed center 14. The link 18 is connected to the link 16 by a pin 17 and the link 22 is connected to the link 18 by a pin 23. Affixed rigidly to the link 22, is a catch 24. Resilient connectors 20 and 21 are provided between links 16 and 18 and between links 22 and 18 respectively so that the members 16, 18, 22 and 24 normally rotate as a unit around the fixed center 14 with the relative positions shown in Figure 4. Member 10 represents a valve stem or like member, which it is intended to operate or reciprocate at fixed intervals. The motion of member 10 is restrained by a guide not shown so that member 10 can move only along a straight vertical line and also it is provided that member 10 cannot descend to a lower position than shown in Figure 4. Affixed rigidly to the member 10 is a stop 12.

Consider now how the kinematic device shown in Figure 4 operates: At the instant shown in Figure 4, the members 16, 18, 22 and 24 are rotating as a unit in a clockwise direction with constant angular velocity around the fixed center 14. As the rotation continues, the catch 24 strikes the stop 12, thereby restraining the motion of link 22. As link 16 continues in its rotation around the fixed center 14, the angle between the links 16 and 18 increases acting as a toggle forcing the member 10 upward along a straight vertical line. When parts 12 and 24 are in contact, catch 24 being near the outer end of member 22, the point of contact between catch 24 and stop 12 acts momentarily as a swivel or secondary axis about which the inner end of member 22 rotates. When the member 10 has been forced up a definite amount the stop 12 clears the catch 24. When this occurs the link 22 carrying the catch 24 flies under the stop 12 and in an instant the members 16, 18, 22 and 24 resume their former relative positions. These members then again rotate as a unit during the remainder of the cycle. Once in each cycle the member 10 is forced upward. It is assumed that a spring or equivalent device returns the member 10 with the stop 12 to its normal position after the upward thrust is discontinued.

While the foregoing description is specific as to details of arrangement and construction of the mechanism, such specific features have been introduced in order to enable those skilled in the art to practice the invention and are not to be considered as limiting the terms of the appended claims.

Having thus described my invention, I claim:—

1. The method of producing a short quick determinative movement comprising revolving a member about an axis, retarding one end of said member while continuing the movement of its other end in the general direction of rotation, and utilizing the resulting radial movement of said member.

2. The method of producing a short quick determinative movement comprising revolving a triangular member about an axis, retarding one corner of said member, continuing the movement of a second corner in the general direction of rotation and utilizing the resultant radial movement of the third corner of said member.

3. The method of producing a short quick determinative movement comprising revolving a member about an axis, the end of said member farthest from said axis lying ahead of the end of said member nearest said axis in the direction of rotation, retarding the outer end of said member while continuing the movement of its inner end in the general direction of rotation and utilizing the resulting radial movement of said member.

4. The method of producing two short quick determinative movements having a predetermined time phase within one revolution comprising revolving a member about an axis, retarding one end of said member while continuing the movement of its other end in the general direction of rotation, utilizing the resulting radial movement of said member, returning said member to its original angular position relative to said axis and repeating said partial retardation with resultant radial movement of said member each radial movement occurring within a given portion of said single revolution of said member about said axis.

5. In the method of operating a cam mechanism including a member rotating about an axis and having means for retarding the rotation of said member a plurality of times during a given revolution about said axis and thereby producing a plurality of radial impulses, the improvement comprising varying the time phase of said retardations to vary the phase of said radial movements.

6. In a method of operating a cam mechanism including a shaft having a cam face rotating synchronously therewith, a member resiliently driven from said shaft and having a cam face contacting with said first mentioned cam face including retarding said resiliently driven member, the improvement comprising reducing the stresses on the moving parts by causing the contacting point or line between said cam members to move outwardly from near the center of said shaft as said resiliently driven member is retarded.

7. In the method of operating a cam mechanism including a rotating member and a plurality of primary members arranged to receive a radial thrust from said rotating member once during each rotation thereof, means for utilizing said thrusts comprising moving secondary members, such as valve stems, in one direction by an impulse derived from the radial movement of some of said primary members and in the opposite direction by impulses derived from the radial movement of the remainder of said primary members.

8. The method of controlling the valve of an internal combustion engine comprising operating said valve in one direction by an impulse derived from a shaft driven by said engine and in the other direction by a second impulse derived from said shaft and both during a given revolution thereof, and varying the time phase of the movements of said valve by adjusting the time between said impulses by the governor of said engine.

9. In mechanisms for producing short quick determinative movements the combination of a shaft, a driving member mounted to rotate with said shaft, a member mounted to rotate about the axis of said shaft and resiliently driven therefrom, means for checking the movement of said resiliently driven member periodically with respect to said shaft, a member pivoted to said resiliently driven member, a propelled member and means for positively actuating said pivoted member to operate said propelled member, said pivoted member also releasing said resiliently driven member from said checking means.

10. In a cam mechanism the combination of a rotating shaft, means providing a cam face rotating synchronously therewith, a collar surrounding said shaft and resiliently driven therefrom, a cam member pivoted to said collar and having a contact with said cam face, means for retarding said collar with respect to said shaft, the arrangement between said collar, said pivoted cam, and said cam face, being such that retardation of said collar produces an outward movement of said pivoted cam member, and a driven member arranged to be operated by the radial movement of said pivoted cam member.

11. In a cam mechanism, the combination of a rotating shaft, a pair of collars resiliently driven from said shaft and having outwardly projecting shoulders thereon, a cam member pivotally mounted on said collars, a driven member designed for operation by said cam member and having a striking face designed to contact with said shoulder once during each revolution of said collars to retard the collars relatively to the shaft, and means whereby the retardation of said collars revolves said cam member on its pivot and thereby thrusts said driven member outwardly away from the shaft and also releases it from said shoulder.

12. The combination with a rotating shaft of a rotating member resiliently driven therefrom, a member pivoted to said resiliently driven member, a driven member, means for checking the rotation of said resiliently driven member at least once in each revolution of said shaft, and means whereby the checking of said resiliently driven member rotates said pivoted member and thereby operates said driven member and at the same time releases said resiliently driven member from said checking means.

13. In a cam mechanism the combination of a rotating shaft, a pair of collars surrounding said shaft and resiliently driven therefrom, a cylinder having rings surrounding said shaft in which the shaft rotates, said collars lying between said rings, a driven member mounted for reciprocation in said cylinder and having checking means thereon for checking the rotation of said collars once during each revolution of said shaft, and means whereby the checking of said collars thrusts said driven member outward from said shaft and likewise releases said collars from said checking means.

14. A mechanism of the class described, a link rotating about the fixed axis, a second link pivoted on its one end to the outer end of said first link, said second link having its other end lying ahead of said first link in the direction of rotation, a third link pivoted to the forward end of said second link, a catch fixed to said third link near its end removed from said second link, a stop adapted to engage said catch to temporarily prevent the rotation of said third link about said axis and to thereby produce a thrust radial to said axis, said parts being so constructed and arranged that the motion of said links due to the rotation of said first link serves to free said catch from said stop, and resilient means for returning said links to substantially the same relative position occupied prior to the engagement of said catch and said stop.

15. In mechanism of class described, a combination of a rotating shaft, a quick-acting mechanism associated with said shaft and having some parts rotating with said shaft and having other parts swiveled on said shaft, said rotating parts and said swiveling parts having means engaging once in each revolution of said shaft to cause an operation of said quick-acting mechanism, and means whereby said swiveling parts may be moved around the axis of said shaft to vary the instant in the rotation of the shaft at which the quick-acting mechanism operates.

16. A mechanism including a member having a primary axis of rotation and a secondary axis of rotation and means whereby said secondary axis is resiliently driven from said primary axis.

17. A mechanism including a member having a primary axis of rotation and a secondary axis of rotation and means whereby said secondary axis is resiliently driven from said primary axis but only during periods when the uniform rotation of the secondary axis about the primary axis is subject to variation.

18. In a mechanism, a member having a stationary primary axis of rotation and a movable secondary axis of rotation, means whereby said secondary axis is periodically held substantially stationary during which periods said member rotates about said secondary axis, and means whereby said rotation of said member about said secondary axis causes said secondary axis to be released and to move.

19. In a mechanism a member having a primary axis of rotation and a secondary axis of rotation in rotation about said primary axis, means whereby said secondary axis is periodically held substantially stationary relative to said primary axis during which periods said member rotates about said secondary axis and means whereby such rotation of said member about said secondary axis is utilized to drive a driven member outwardly from said primary axis.

20. In a cam mechanism having uniform rotation about a primary axis, a member adapted to rotate about a secondary axis, means for retarding rotation of said member about said primary axis a plurality of times during a given revolution of said mechanism about said primary axis whereby a plurality of impulses are projected radially from said primary axis.

21. In a cam mechanism having uniform rotation about a primary axis, a member adapted to rotate about a secondary axis and means for retarding rotation of said member about said primary axis a plurality of times during a given revolution of said mechanism about said primary axis with a consequent momentary rotation of said member about said secondary axis at each of said times, whereby a plurality of impulses are projected radially to said primary axis.

22. In a cam mechanism having uniform rotation about a primary axis, a member adapted to rotate about a secondary axis and means for retarding rotation of said member about said primary axis a plurality of times during a given revolution of said mechanism about said primary axis with a consequent momentary rotation of said member about said secondary axis at each of said times, whereby a plurality of impulses are projected radially to said primary axis and whereby the phase relation of said retardations of the rotaton of said member can be varied so as to vary the time phase of said radial impulses.

23. A mechanism for producing periodic thrusts, including a series of links or members and having a fixed axis of rotation, in combination with means whereby the engagement of a catch with a stop causes a quick thrust to be produced outwardly from said axis, and means whereby said thrust releases said catch from stop, and means whereby said links or members are returned to initial relative positions in preparation for the next outward thrust.

24. A mechanism, adapted to utilize the motion of a member rotating continuously about a fixed axis for producing at intervals quick thrusts outwardly from said axis, comprising a series of links or members, including a catch and a stop, and means whereby said catch periodically engages with said stop thereby causing relative movement between certain of the links or members, which movement is utilized to produce a thrust outwardly from said fixed axis, means whereby said thrust releases said catch from said stop, and means whereby the links or members are returned to initial positions preparatory to producing the next outward thrust which occurs with the continued rotation of said rotating member.

25. A mechanism comprising a series of links or members, including a continuously rotating member which rotates about a fixed axis in combination with means whereby the movement of said continuously rotating member causes first the engagement of a catch with a stop, second, relative movement between certain of the members which is utilized to produce an outward thrust, and third the release of said catch from said stop and means whereby the links are returned to their former relative positions preparatory to repeating the foregoing cycle.

26. An engine and means whereby the opening and the closing of any one or more of the valves thereof can be independently adjusted while the engine is in operation to any desired combination of phase relationships in the timing thereof.

27. Two valves and a rocker in such combination with springs and a rod connecting with a governing mechanism that oscillation of the rocker by impulse from the governor tends to open or close a valve while holding the other valve closed.

28. The combination of a rotating shaft, an engine valve, means for operating said valve first in one direction and then in the other, means whereby said valve is operated from said shaft in both directions during a given revolution of the shaft, and means for adjusting the time between the opposite motions of the valve.

In testimony whereof I affix my signature.

WINDER E. GOLDSBOROUGH.